(12) United States Patent
Park

(10) Patent No.: US 7,980,838 B2
(45) Date of Patent: Jul. 19, 2011

(54) ELECTRIC SPINNING APPARATUS FOR MASS-PRODUCTION OF NANO-FIBER

(75) Inventor: Jong-Chul Park, Seoul (KR)

(73) Assignee: Finetex Ene, Inc., Seoul (KR)

( * ) Notice: Subject to any disclaimer, the term of this patent is extended or adjusted under 35 U.S.C. 154(b) by 611 days.

(21) Appl. No.: 12/078,003

(22) Filed: Mar. 26, 2008

(65) Prior Publication Data

US 2008/0241297 A1 Oct. 2, 2008

(30) Foreign Application Priority Data

Mar. 27, 2007 (KR) .................. 10-2007-0029866
May 7, 2007 (KR) .................. 10-2007-0044036
Jan. 11, 2008 (KR) .................. 10-2008-0003649

(51) Int. Cl.
*D01D 5/00* (2006.01)
*D04H 3/03* (2006.01)

(52) U.S. Cl. ............. 425/83.1; 425/174.8 E; 425/382.2; 425/464

(58) Field of Classification Search ............. 425/83.1, 425/174.8 E, 382.2, 464
See application file for complete search history.

(56) References Cited

U.S. PATENT DOCUMENTS

| | | | |
|---|---|---|---|
| 2,116,942 A * | 5/1938 | Formhals .................. 264/10 |
| 3,570,653 A * | 3/1971 | Cullen ..................... 425/83.1 |
| 6,604,925 B1 * | 8/2003 | Dubson ..................... 425/6 |
| 6,616,435 B2 * | 9/2003 | Lee et al. .................. 425/83.1 |
| 6,991,702 B2 * | 1/2006 | Kim ......................... 156/379.6 |
| 2005/0233021 A1 * | 10/2005 | Chun et al. ............ 425/174.8 E |

* cited by examiner

*Primary Examiner* — Yogendra N Gupta
*Assistant Examiner* — Joseph Leyson
(74) *Attorney, Agent, or Firm* — Nixon & Vanderhye P.C.

(57) ABSTRACT

The present invention relates to an electrospinning apparatus for mass-production of nanofibers, particularly to an electrospinning apparatus with an electric stability and an improved nozzle blocks. The bottom-up electrospinning apparatus for the mass-production of nanofiber comprises at least one nozzle block having a plurality of spinning nozzles arranged in the horizontal and vertical direction; a collector installed over the nozzle blocks in order to correspond to the nozzle blocks and maintain a certain distance in between; a power source to apply voltage difference between the nozzle block and the collector; and a spinning solution container to supply the spinning solution to the nozzle block, wherein the nozzle block and the collector are connected to the positive terminal and the negative terminal, respectively and among a plurality of spinning nozzles arranged along the horizontal line, a spinning nozzle in the middle and a spinning nozzle in the end have different height.

14 Claims, 3 Drawing Sheets

(A)

(B)

ELECTRIC SPINNING APPARATUS FOR MASS-PRODUCTION OF NANO-FIBER

CROSS REFERENCE TO RELATED APPLICATION

This application claims the benefit of Korean Patent Application Nos. 10-2007-0029866 filed on 27 Mar. 2007, 10-2007-0044036 filed on 7 May 2007 and 10-2008-0003649 filed on 11 Jan. 2008, incorporated herein by reference in its entirety.

TECHNICAL FIELD

The present invention relates to an electrospinning apparatus for mass-production of nanofiber, particularly to an electrospinning apparatus with an electric stability and an improved nozzle blocks.

BACKGROUND ART

Generally, a nanofiber refers to a fiber having an average diameter of 5 to 1,000 nm, which may be applicable to the nanofiber prepared or may be prepared according to the present invention. The nanofiber is usually produced by electrospinning a spinning solution, and the nanofiber is electrospun in bottom-up, top-down or parallel production process. Each method has both advantage and disadvantage, but it has been acknowledged that those three known methods are not suitable for the mass-production of nanofiber. In particular, in the case of the top-down electrospinning process, inhomogeneous electrospinning may occur at a certain time or location during the process and it may cause deterioration of the entire quality of the product, which is, therefore, not suitable for mass-production. For this reason, the bottom-up electrospinning process is useful for the mass-production, but a problem sill remain in this process that the electrospinning solution may partially form droplets at an outlet of nozzle due to an inhomogeneous electric field.

Korean Patent Publication No. 2005-0077313 discloses an apparatus for electrospinning nanofiber. The object of the above prior art is to provide an electrospinning apparatus in bottom-up production process, wherein a plurality of nozzles are arranged in narrow space in order to increase the production per unit time and a nozzle block is formed at the lower end of a collector in order to prevent a spinning solution from forming a droplet. In order to achieve the object, the above prior art provides a bottom-up electrospinning devices, wherein the outlets of nozzles installed on a nozzle block are formed in an upper direction and a collector is located on the top part of the nozzle block. Typically, a high voltage of about 20 kV should be applied between the nozzle block and the collector for electrospinning fibers. The apparatus according to the above prior art, however, comprises complicated electric devices relating to the nozzle block and these devices should be insulated from a high voltage of the nozzle block, which makes it difficult to produce nanofiber in large scale.

Another conventional technique is disclosed in Korean Patent No. 10-0679073. The object of the presented prior art is to provide a method for producing nanofiber in a continuous electrospinning process, wherein a collector is inclined at a certain angle against the ground or nozzles are installed forming a certain angle with the collector in order to avoid forming droplets of spinning solution. This process, however, has a disadvantage that a solvent used during the insulating of electric devices and spinning processes may fall down to spinning nozzles.

U.S. Pat. No. 7,134,857 discloses an apparatus for electrospinning nanofiber conducive to mass production using a rotatable spray head and forming an electric field between collectors which is grounded and an electrospining solution is electrospun to the collector guided by the electric field. This process, however, is not suitable for a continuous process.

In order to achieve the mass production of the nanofiber, therefore, an apparatus should be electrically stable and have an improved nozzle block structure capable of homogeneous electrospinning.

The object of the present invention is to provide an electrospinning apparatus for the mass production of nanofibers having electric stability and an improved structure of a nozzle block.

DISCLOSURE OF THE INVENTION

According to a preferred embodiment of the present invention, a bottom-up electrospinning apparatus for the mass-production of nanofiber comprises at least one nozzle block having a plurality of spinning nozzles arranged in the horizontal and vertical direction; a collector installed over the nozzle blocks in order to correspond to the nozzle blocks and maintain a certain distance in between; a power source to apply voltage difference between the nozzle block and the collector; and a spinning solution container to supply the spinning solution to the nozzle block, wherein the nozzle block and the collector are connected to the positive terminal and the negative terminal, respectively and among a plurality of spinning nozzles arranged along the horizontal line, a spinning nozzle in the middle and a spinning nozzle in the end have different height.

According to other preferred embodiment of the present invention, a nozzle block used in the bottom-up electrospinning apparatus for mass-production of nanofiber includes a plurality of nozzle blocks arranged in the horizontal and vertical direction and at least two of a plurality of spinning nozzles arranged on the horizontal line have different height.

Hereinafter, the present invention will be described in detail with reference to drawings and embodiments. These embodiments are provided only for the illustrative purpose, and it should not be construed that the scope of the invention is limited thereto.

Figure 1:
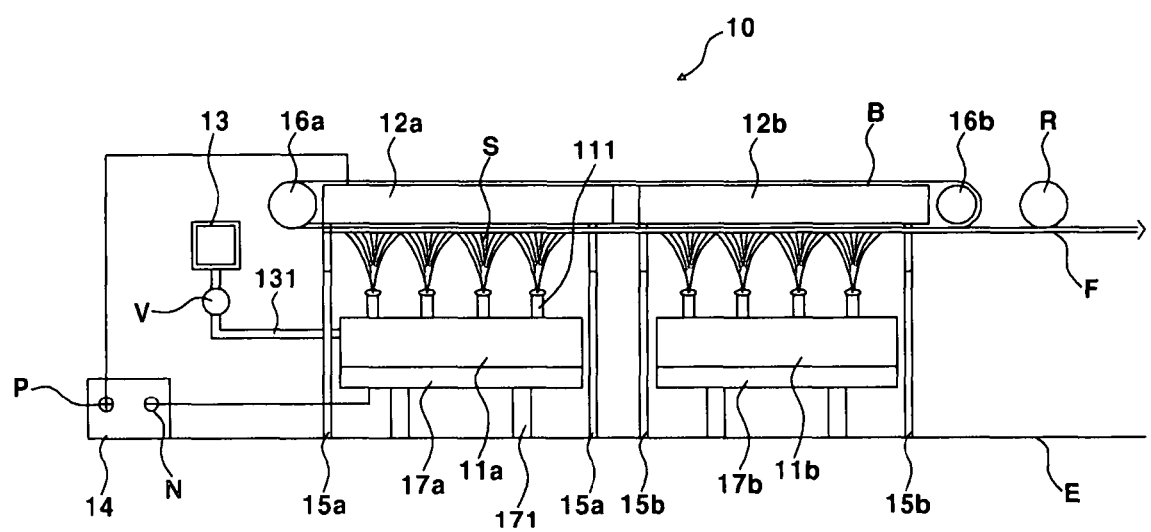
FIG. 1 shows a schematic illustration of a bottom-up electrospinning apparatus (10) according to the present invention.

FIG. 1 shows a schematic illustration of a bottom-up electrospinning apparatus 10 according to the present invention.

The electrospinning apparatus 10 comprises a plurality of nozzle blocks 11a, 11b having a plurality of spinning nozzles 111 arranged in a certain manner on its upper plane; a plurality of collectors 12a, 12b installed at a certain distance above the nozzle blocks 11a, 11b in parallel with each nozzle block 11a, 11b; a spinning solution container 13 to provide the spinning solution through a pipe 131 to the nozzle block 11a, 11b; and a power source 14 to supply power to the nozzle blocks 11a, 11b and the collectors 12a, 12b.

Each separate nozzle block 11a, 11b is installed on fixing tables 17a, 17b and at least two nozzle blocks are arranged continuously thereon and the fixing tables 17a, 17b have legs 171 fixed to the ground. The nozzle blocks 11a, 11b are installed in a plurality numbers, which makes it easy to adjust the voltage applied to a nozzle 111 and to adjust and form the degree of inclination of the nozzle 111. According to an embodiment shown in FIG. 1, two nozzle blocks 11a, 11b are arranged, but, if necessary, the number of nozzle blocks 11a, 11b may be increased.

Collectors 12a, 12b are installed above the nozzle blocks 11a, 11b so as to be in parallel with the nozzle blocks, maintaining a certain distance in between. Depending on the relative position of the nozzle block 11a, 11b and the collectors 12a, 12b, the electrospinning apparatus may be divided into the bottom-up apparatus and the top-down apparatus. On the basis of the ground, if the nozzle blocks 11a, 11b are located under the collectors 12a, 12b, the electrospinning apparatus is classified as bottom-up apparatus. If they are located in the opposite way, the apparatus is classified as top-down apparatus. According to the present invention, the electrospinning apparatus may have any form, but preferably be a bottom-up apparatus. A plurality of collectors 12a, 12b are arranged continuously in a row so as to correspond to the number of nozzle blocks 11a, 11b and each collector 12a, 12b is supported by a plurality of supporting bars 15a, 15b installed on the ground E. The collectors 12a, 12b are surrounded by a rotating belt B operated by rollers 16a, 16b, and the belt B rotates along the both sides of the collectors 12a, 12b in order to move forward a base material F toward a winding roller R.

The spinning solution is supplied through a tube or a pipe 131 to nozzle blocks 11a, 11b from the solution container. The amount of spinning solution supplied from the spinning solution 13 to nozzle blocks 11a, 11b is adjusted by a controlling valve V and the spinning solution container 13 is installed at a relatively higher position from the ground compared to the position of the nozzle blocks 11a, 11b, which enables the spinning solution to be fed to the nozzle blocks 11a, 11b under pressure created by difference in height. Alternatively, a pressure pump (not shown) may be installed in the spinning solution container 13 in order to adjust the pressure of the spinning solution supplied to the nozzle block 11a, 11b or a spinning nozzle 111.

In order to collect nanofiber in the collectors 12a, 12b after a spinning solution S is spun from the spinning nozzle 111, the nozzle blocks 11a, 11b and the collectors 12a, 12b should maintain a certain voltage difference in between. A power source 14 maintains a certain voltage difference of 1 kV to 30 kV between the nozzle blocks 11a, 11b and the collectors 12a, 12b. The nozzle blocks 11a, 11b and the collectors 12a, 12b may be connected to a positive terminal P and a negative terminal N of the power source 14, respectively, such that they have different polarity. The positive terminal P and the negative terminal N may be connected to the nozzle blocks 11a, 11b and the collector 12a, 12b in any manner, however, it is preferred that the positive terminal P may be connected to the collectors 12a, 12b and the negative terminal N may be connected to the nozzle blocks 11a, 11b.

By means of the power source 14, the nozzle blocks 11a, 11b and the collectors 12a, 12b have a certain voltage difference in between and the spinning solution S is supplied from the spinning solution container 13 to the nozzle blocks 11a, 11b and then the spinning solution S is spun from the spinning nozzle 111 and collected to the base material F of the collectors 12a, 12b. While the spinning solution S is spun, the rollers 16a, 16b simultaneously rotate the belt B and due to the rotation of the belt B, the nanofiber is collected to the base material F, and then the base material F is passed through between the nozzle blocks 11a, 11b and the collectors 12a, 12b. After nanofiber with a required thickness are collected to the base material F, they are collected to a winding device by using the winding roller R. During the process for mass-production of nanofiber, a high voltage is applied between the nozzle blocks 11a, 11b and the collectors 12a, 12b, thus there should be a means to ensure the electric stability and a means to adjust or maintain the collecting thickness due to the size of the nozzle blocks 11a, 11b and the collectors 12a, 12b. These means may be provided according to the arrangement of the nozzle blocks 11a, 11b and the spinning nozzle 111.

Figure 2:
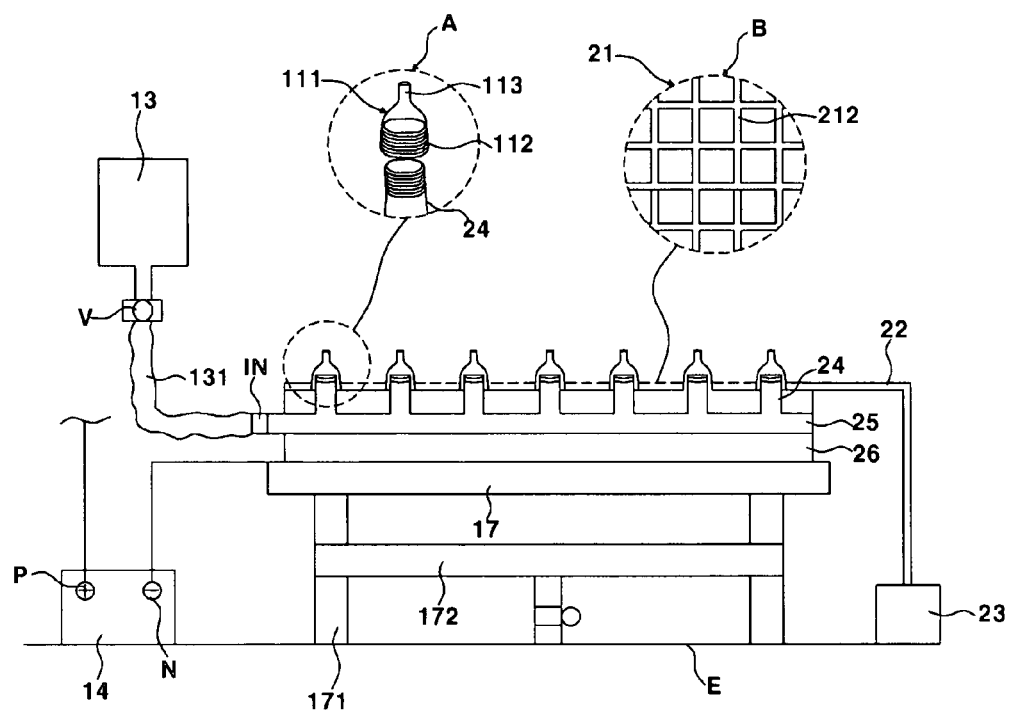
FIG. 2 shows an embodiment of the nozzle blocks of the electrospinning apparatus according to the present invention.

FIG. 2 shows an embodiment of the nozzle blocks of the electrospinning apparatus according to the present invention.

The nozzle blocks used for electrospinning the spinning solution supplied from the spinning solution container 13 to the collector comprise the spinning nozzle 111 electrospinning the spinning solution; a reservoir 25 holding the spinning solution temporarily; a lower conductive plate 26 maintaining a certain voltage difference between the nozzle blocks and the collectors; a protruding tube 24 supplying the spinning solution from the reservoir 25 to the spinning nozzle 111; and a screen cover 21 shielding the top surface of the nozzle blocks.

The nozzle block is in the form of rectangular having length and width in meters and the entire nozzle block should be made by conductive metal or metal alloy in order to maintain high voltage difference with the collectors. The lower conductive plate 26 made by conductive metal is installed on the fixing table 17 capable of adjusting its height with a height adjusting device 172. The thickness of nanofiber collected in the collector is determined by the spinning voltage and spinning gap. It may be considered about a method of adjusting the spinning voltage in order to have a required thickness of the collected nanofiber; or a method of adjusting the spinning gap between the collectors and the nozzle blocks. It is preferred, however, to adjust the spinning gap considering the stability of the entire apparatus. In order to adjust the height of the fixing table 17, an appropriate device for adjusting height 172 may be installed under the table. The reservoir 25 formed over the lower conductive plate 26 supplies a temporarily stored spinning solution through the protruding tube 24 to the spinning nozzle 111. The surface surrounding the reservoir 25 may be made of conductive metals or metal composites. The protruding tube 24 may be manufactured separately or directly fabricated on the top surface of the reservoir 25. As shown in FIG. 2 (marked as A), the spinning nozzle 111 includes a nozzle part 113, the protruding tube 24 and a connecting part 112 wherein they are screwed together. A proper insulation material such as resin may be filled up between protruding tubes 24 and the screen cover 21 is installed over the insulation materials. The top surface of the nozzle blocks equipped with the insulators are formed to be inclined with its end portion low and, as shown in FIG. 2 (marked as B), the screen cover 21 may have grid-shaped gaps 121 thereon. When the spinning solution is spun from the spinning nozzle 111, some of the spinning solution may not be collected in the collectors but dropped on the top surface of the nozzle block 11. In order to remove such dropped spinning solution on the nozzle block 11, the insulation materials filled on the nozzle block is inclined with its end portion low, and as a result, the dropped solution is flowing toward the end portion of the nozzle block 11. In this manner, the spinning solution may be collected at the end portion and then moved through a drain pipe 22 and collected in a disposal container 23 to be recycled or disposed as a waste. The screen cover 21 has a grid-shaped structure in order to prevent the dropped spinning solution from being volatilized toward between the nozzle block 11 and the collector.

The spinning solution is supplied from the solution container 13 through a pipe 131 to the reservoir 25. The solution container 13 and the pipe 131 are made by an insulation material e.g. resin and connected to an inlet IN formed at one end of the reservoir 25. Since the height of the nozzle block is adjustable, the pipe 131 is preferably made of a flexible material capable of corresponding to the adjustment of the height of nozzle block.

The power source 14 is a device for maintaining high voltage between the nozzle block and the collector. The positive terminal of the power source 14 may be connected to the collector and the negative terminal may be connected to the lower conductive plate 26 of the nozzle block.

According to the present invention, a plurality of nozzle blocks is continuously arranged and each of nozzle blocks may include a plurality of spinning nozzles. In order to achieve the homogeneity of electrospinning and the thickness of the collected nanofiber, it is preferred to arrange the spinning nozzles in a certain form.

Figure 3:
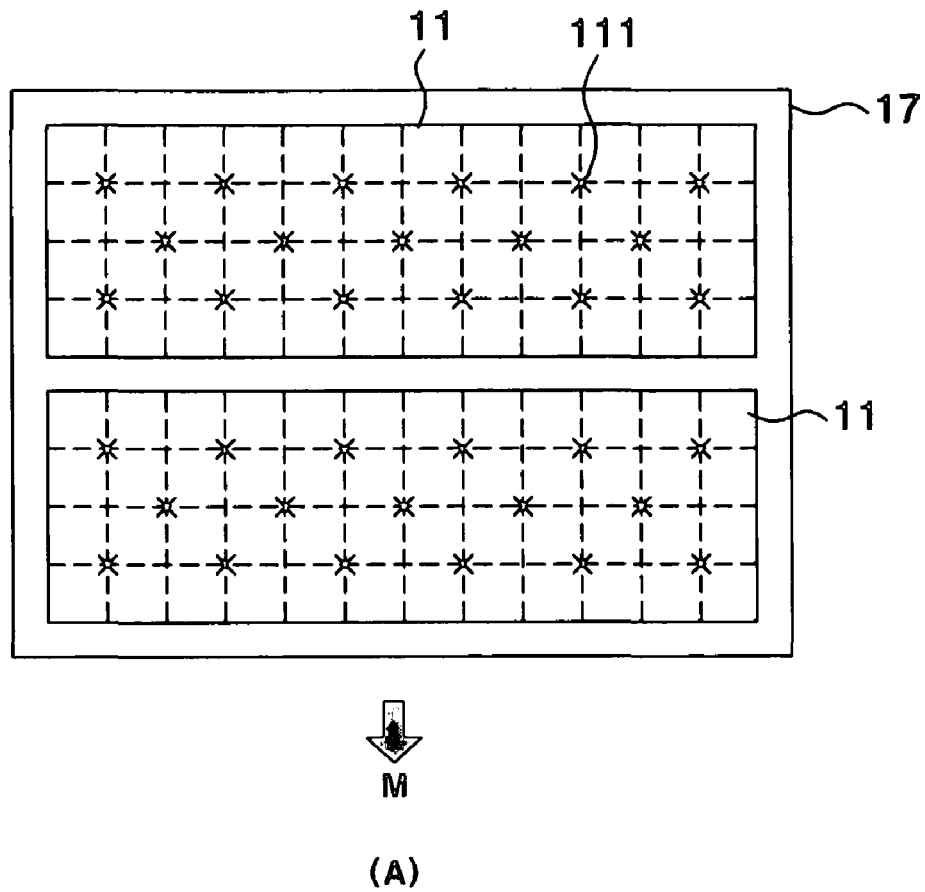
FIG. 3(A) and 3(B) show embodiments of the structure of spinning nozzles arranged on the nozzle block of the electrospinning apparatus according to the present invention.
Figure 3:
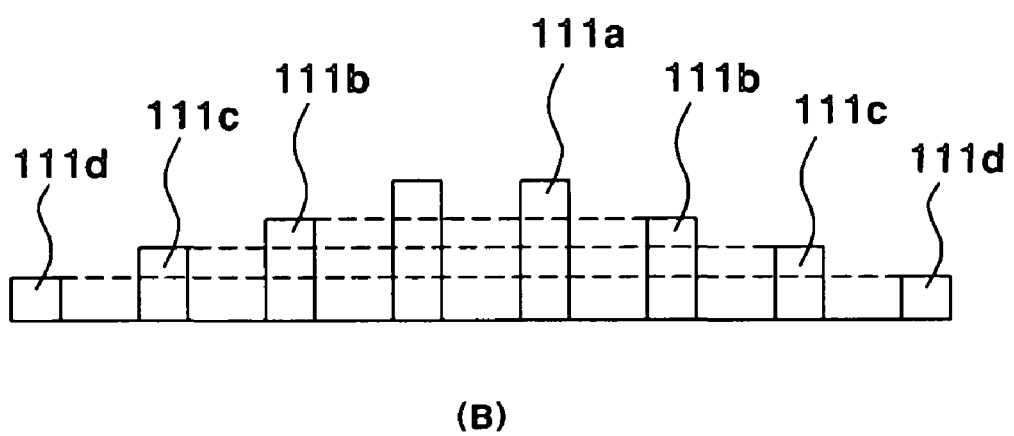

FIG. 3(A) and 3(B) show embodiments of the structure of spinning nozzles arranged on the nozzle block of the electrospinning apparatus according to the present invention.

A plural number of nozzle blocks 11 may be installed on the fixing table. The FIG. 3(A) shows one fixing table 17 equipped with two nozzle blocks 11, but if necessary, the fixing table 17 may be equipped with at least one nozzle block 11. A direction marked "M" in FIG. 3(A) shows the process direction of the base material (shown in FIG. 1). Each of spinning nozzles 111 is installed at places marked as "X" on the nozzle block 11. The spinning nozzle 111 is installed along each of the horizontal and vertical lines and the horizontal lines are arranged based on a "filling structure", which means that, as shown in FIG. 3(A), each spinning nozzle which consists of the horizontal line is arranged between any of two spinning nozzles which consist of the front horizontal line. The FIG. 3(A) shows an embodiment that the horizontal lines are arranged on every second vertical line (dotted lines) and the spinning nozzle 111 arranged on the horizontal line is disposed between the spinning nozzles 111 of the front horizontal lines. Thus, two lines form a unit structure and these unit structures are repeated along the process direction of the base material marked as "M". If the spinning nozzles 111 arranged along the horizontal line are arranged on every third vertical line, three lines form an unit structure, and then repeated based on the three lines of unit along the process direction of the base material marked as "M". In this manner, the spinning nozzles disposed on the nozzle blocks of the electrospinning apparatus according to the present invention may be arranged by the "filling structure" based on a certain lines of unit. According to the structure, the spinning nozzles 111 which consist of the horizontal line may have a uniformed height, but each of spinning nozzles 111 may be preferred to have different height as shown in FIG. 3(B).

The FIG. 3(B) shows an embodiment of the structure of spinning nozzles which may be arranged along the horizontal lines. The spinning nozzles arranged along the horizontal line may have different height. The spinning nozzle in the middle 111a, for example, may be the highest and the height of the rest of spinning nozzles may be getting lower toward the both ends. Overall, the height of the spinning nozzles may be symmetrical on the basis of the middle spinning nozzle 111a. In this manner, each of spinning nozzles arranged along the horizontal line may have different height. The difference in height between the middle spinning nozzle 111a and the end spinning nozzle 111d may be varied depending on the spinning voltage applied between the nozzle block and the collector. Under a higher spinning pressure, for example, the difference in height between the middle spinning nozzle 111a and the end spinning nozzle 111d may be increased and under a lower spinning pressure, the difference in height may be decreased. The height difference of two spinning nozzles 111b, 111c arranged between the middle spinning nozzle 111a and the end spinning nozzle 111d may be determined by proportionally allotting the difference of the two spinning nozzles 111a, 111d. The FIG. 3(B) shows that the height of the end spinning nozzle 111d gets lowered on the basis of the middle spinning nozzle 111a. The structure of spinning nozzles (111a, 111b, 111c, 111d), however, do not necessarily follow the embodiment of the FIG. 3(B). In real practice, the difference in height of spinning nozzles (111a, 111b, 111c, 111d) is determined by measuring the thickness of the nanofiber web collected in the base material. The thickness of the nanofiber web is measured in the vertical direction of the process direction of the base material, and as a result, if the thickness of the nanofiber web is greater at a certain position, the spinning nozzle disposed at the certain position may be arranged higher than the rest of spinning nozzles. In this manner, the height of each spinning nozzle arranged along the horizontal line may be determined by measuring the thickness of the nanofiber web.

While the present invention is described with reference to particular embodiments thereof, it will be understood by those skilled in the art that variations or amendment may be made therein without departing from the sprit and scope of the invention. The scope of the present invention is not limited by those variations or amendments, but by the following claims.

Effects of Invention

The electrospinning apparatus according to the present invention has advantages of reducing the risky factors which may occur during the mass-production of nanofibers due to the high voltage appliance and producing nanofibers with homogeneous quality with structure designed for improving homogeneity of spinning.

The invention claimed is:
1. A bottom-up electrospinning apparatus for the mass-production of nanofibers comprising:
   at least one nozzle block having a plurality of spinning nozzles arranged in the horizontal and vertical direction;
   a collector installed over the nozzle blocks in order to correspond to the nozzle blocks and maintain a certain spinning distance in between;
   a power source to apply voltage difference between the nozzle block and the collector; and
   a spinning solution container to supply the spinning solution to the nozzle block;
   wherein the nozzle block and the collector are connected to the positive terminal and the negative terminal of the power source, respectively such that they have different polarity, and among a plurality of spinning nozzles arranged along a horizontal line, a spinning nozzle in the middle and a spinning nozzle in the end have different height;
   wherein the plurality of spinning nozzles are arranged according to a filling structure having a repeating unit structure along a process direction relative to the nozzle block; and
   wherein the filling structure comprises an arrangement of the plurality of spinning nozzles such that spinning nozzles in adjacent horizontal lines are offset, with each spinning nozzle in one horizontal line being disposed between two spinning nozzles of an adjacent horizontal line in the process direction.

2. The bottom-up electrospinning apparatus according to claim 1, wherein the spinning solution container is positioned higher than the nozzle block on the basis of the ground.

3. The bottom-up electrospinning apparatus according to claim 1, wherein a screen cover with grid structure is installed over the nozzle block.

4. The bottom-up electrospinning apparatus according to claim 1, wherein the bottom-up electrospinning apparatus further comprises a fixing table for fixing the nozzle block.

5. The bottom-up electrospinning apparatus according to claim 4, wherein the height of the fixing table is adjustable.

6. The bottom-up electrospinning apparatus according to claim 1, wherein the height of the spinning nozzle in the middle is higher than that of the spinning nozzle in the end.

7. The bottom-up electrospinning apparatus according to claim 1, wherein the height of spinning nozzle arranged along the horizontal line is symmetrical about the center.

8. The bottom-up electrospinning apparatus according to claim 7, wherein the height of spinning nozzles along the horizontal line is getting higher from the end toward the center.

9. A bottom-up electrospinning apparatus for the mass-production of nanofibers comprising:
   at least one nozzle block having a plurality of spinning nozzles arranged in the horizontal and vertical direction;
   a collector installed over the nozzle blocks in order to correspond to the nozzle blocks and maintain a certain spinning distance in between;
   a power source to apply voltage difference between the nozzle block and the collector; and
   a spinning solution container to supply the spinning solution to the nozzle block;
   wherein the nozzle block and the collector are connected to the positive terminal and the negative terminal of the power source, respectively such that they have different polarity, and among a plurality of spinning nozzles arranged along a horizontal line, a spinning nozzle in the middle and a spinning nozzle in the end have different height,
   wherein a screen cover with grid structure is installed over the nozzle block, and
   wherein the top surface of the nozzle block is inclined toward the edge in order that a dropped spinning solution may flow down.

10. The bottom-up electrospinning apparatus according to claim 9, wherein the bottom-up electrospinning apparatus further comprises a container for collecting a dropped spinning solution.

11. A nozzle block used in the bottom-up electrospinning apparatus for mass-production of nanofibers, wherein a plurality of spinning nozzles arranged in the horizontal and vertical direction is included and at least two of a plurality of spinning nozzles arranged on a horizontal line have different height;
   wherein the plurality of spinning nozzles are arranged according to a filling structure having a repeating unit structure along a process direction relative to the nozzle block; and
   wherein the filling structure comprises an arrangement of the plurality of spinning nozzles such that spinning nozzles in adjacent horizontal lines are offset, with each spinning nozzle in one horizontal line being disposed between two spinning nozzles of an adjacent horizontal line in the process direction.

12. The nozzle block according to the claim 11, wherein at least two spinning nozzles having different height are arranged symmetrically on the basis of the middle spinning nozzle on the horizontal line such that the height of the spinning nozzles is symmetrical.

13. The nozzle block according to the claim 11, wherein the spinning nozzle located in both ends among at least two spinning nozzles having different height is lower than the spinning nozzle in the middle.

14. The nozzle block according to the claim 11, wherein the top surface of the nozzle block is inclined toward the edge of the nozzle block in order that the spinning solution dropped during the electrospinning process flows down.

* * * * *